May 5, 1959 R. A. WILLIAMS ET AL 2,885,571

SEMICONDUCTOR DEVICE

Filed Dec. 3, 1954 2 Sheets-Sheet 1

INVENTORS
RICHARD A. WILLIAMS
JOHN W. TILEY

BY

[signature]

ATTORNEY

INVENTORS
RICHARD A. WILLIAMS
JOHN W. TILEY
BY
ATTORNEY

United States Patent Office 2,885,571

Patented May 5, 1959

2,885,571

SEMICONDUCTOR DEVICE

Richard A. Williams, Collingswood, N.J., and John W. Tiley, Hatboro, Pa., assignors to Philco Corporation, Philadelphia, Pa., a corporation of Pennsylvania Application December 3, 1954, Serial No. 472,826

22 Claims. (Cl. 307—88.5)

The present invention relates to semiconductor devices, and particularly to such devices which are suitable for operation at high signal frequencies. This application is a continuation-in-part of our copending application Serial No. 395,823, filed December 2, 1953, and entitled "Electrical Device," now abandoned.

Signal-amplifying devices utilizing crystalline semiconductors as the environment within which the significant, gain-producing interactions of currents of charged particles take place are now well known in the art, and their potentialities with respect to compactness, low power consumption and ruggedness have been widely recognized. Prior to the present invention these devices have been of two major types, commonly designated the point-contact transistor and the junction transistor.

The point-contact transistor comprises generally a body of crystalline semiconductive material containing traces of appropriate impurities, against the surface of which are forced the finely sharpened points of a pair of filamentary contacts, commonly known as whiskers. In all practical forms of the point-contact transistor, it has also been necessary to "form" the point-contacts by passing a heavy current through one or both contacts until a sufficient quantity of the material of the whisker has been diffused or alloyed into the crystal to produce a local change in conductivity-type of the crystal in the vicinity of the whisker. With proper construction, signals applied between one whisker—designated the emitter—and the semiconductor body or base, will appear in amplified form across a load circuit connected between the other whisker and the base. Although satisfactory for some purposes and in certain applications, the point-contact transistor possesses certain inherent characteristics which have prevented it from realizing the potentialities of solid-state amplifiers to their fullest extent. First, the necessity for maintaining the whiskers upon the crystal surface with uniform pressure and substantially entirely invariant spacing imposes a serious problem of mechanical stability in the point-contact transistor. Secondly, the necessity for fine point-contacts limits severely the current-handling capacity of this transistor type. But even if properly adjusted and operated within ratings, the point-contact transistor suffers from inherent electrical instability as a result of the current gain of more than unity commonly characterizing those units which are capable of providing reasonable amplification. Because of this large value of current gain, the device itself possesses positive feedback which is of a nature to tend to destroy the device by overheating unless prevented by means of appropriate external circuit elements. Furthermore, the point-contact transistor usually requires supply voltages of at least several volts to provide adequate gain and linearity. It therefore does not provide the reduction in power consumption which might be obtained in low-level circuit applications with a device operable at lower supply voltages.

The above limitations of the point-contact transistor, together with its relatively poor noise figure and modest gain, are among the factors which have contributed to the recent tendency toward a transfer of interest and developmental effort from the point-contact transistor to the other and later-appearing major type, namely the junction transistor.

The junction transistor may be described briefly as one in which the whiskers of the point-contact transistor are replaced by junctions—i.e., transitions between opposite conductivity types produced within a single-crystalline body by differences in the concentrations of donor and acceptor atoms therein. Thus it may comprise, for example, a single-crystalline body of semiconductive material having a central region of N-type material sandwiched between a pair of P-type regions. The two transition regions from P- to N-type material are designated P–N junctions, and possess rectifying properties roughly analogous to those of the whisker contacts in the point-contact device. The central, N-type region then serves as the base region, while the adjacent junctions, or transitions to opposite conductivity type, comprise the emitter and collector.

In the junction transistor, substantial improvements have been realized in certain of those characteristics of the point-contact transistor which have limited the success of the latter device in some applications. The mechanical stability is obviously greatly improved in the junction transistor since no whisker contacts are employed. Because the cross-section of the current path through the junction transistor may be made relatively large, its current-handling capacity may be made correspondingly greater. It is inherently stable electrically, and its operating characteristics are such that substantial gain and excellent linearity may be obtained with extremely low supply voltages, e.g. a small fraction of a volt. The noise figure and the gain of the junction transistor are also usually superior to those of the point-contact transistor.

Although at its best representing a substantial improvement in many respects over the point-contact transistor, the junction transistor is difficult to fabricate with the precision and reproducibility requisite for full exploitation of its inherent potentialities. Besides increasing the cost and reducing the reliability of junction transistor, these fabrication difficulties appear to impose practical limitations upon performance in certain respects. One important respect in which this is so relates to the high-frequency cut-off of such devices, the conventional criterion of which is the alpha-cutoff $f_{\alpha c}$. To extend upward the alpha-cut-off, it is necessary to reduce the width of the base region between emitter and collector to a very small, substantially uniform value. In one principal method of fabrication, the transistor is formed in the process of growing single crystals by the pulling method, through appropriate alternation of the conductivity-type of the melt during pulling. Not only is it extremely difficult to control this process to give a sufficiently narrow base width, but the geometry of the transistor is severely limited by the method of production. There is therefore little freedom in controlling the configuration of the transistor to take advantage of possible improvements in geometry. As one example of the geometric limitations of the pulled-junction transistor, even if a reproducibly narrow base region can be obtained by pulling, there remains an additional and substantial difficulty in making low-resistance ohmic contact to such a narrow region.

The other principal method of fabrication of junction transistors is by the so-called alloying process, which lends itself to substantially greater control of geometric configuration. In this process, pellets of an acceptor-type metal such as indium may be placed upon the opposite surfaces of a wafer of N-type germanium, for example, and the assembly raised to a high temperature with the object of diffusing the indium into the germanium from both sides, leaving only a thin central region of germanium free of indium. The central region then remains N-type while the penetrated regions are converted in part to P-type germanium by the indium. Although this method of construction permits substantially improved control and choice of the geometry of the semiconductive wafer, the geometry of the junctions themselves is relatively difficult to control. As is well known, to produce junction transistors for operation at high frequencies the junctions should be substantially plane-parallel and very close together, although not contiguous. However, diffused junctions tend to be convex inward and irregular rather than plane-parallel, and the high-temperature diffusing process required to produce the desired small junction separation is difficult to control accurately. For these and other reasons, it has not heretofore been possible to produce junction transistors consistently with values of alpha-cutoff as high as are desirable for many applications.

As an additional drawback, the heating and alloying required in the alloying process tend to produce remanent stresses in the crystal structure when the device is subsequently operated at normal temperatures, with resultant anomalous effects on electrical performance.

It is therefore one object of our invention to provide a new and improved type of semiconductive signal-translating device.

Another object is to provide a new semiconductive amplifying device which is easy to construct reproducibly, and is reliable in operation.

A further object is to provide a new type of semiconductive amplifier which is superior in stability and performance to the point-contact transistor, and easier to fabricate accurately and reproducibly than the junction transistor.

Another object is to provide a new type of semiconductive amplifying structure which may be operated at higher frequencies than previously available stable transistors.

In accordance with our invention, the above objectives are achieved by the provision of a semiconductive structure comprising a minority-carrier-injecting area-contact to a semiconductive body, and minority-carrier collecting means disposed in closely confronting relationship to the area-contact and characterized by an ability to reduce the concentration of minority-carriers in the immediate vicinity thereof. Although it may take one of several other forms, in one preferred embodiment the closely-confronting collecting means comprises the potential-barrier region adjacent to a second rectifying area-contact to an opposing surface of the semiconductive body. The resultant simple structure consisting of a pair of area-contacts on opposite, closely-spaced surfaces of a semiconductive body then comprises a particularly advantageous form of our device in which one area-contact serves as an emitter of minority-carriers, the other area-contact serves as a collector of minority-carriers and the semiconductive body serves as the base region to which low resistance ohmic connection is usually made. The advantages of such a construction from the viewpoints of mass producibility and high-frequency response will be indicated more fully hereinafter.

The improved semiconductive device of our invention in its preferred form makes use of at least three important features, each of which will be discussed separately hereinafter. The first of these derives from our discovery that an area-contact to an external surface of a semiconductive body may be utilized as an efficient injector of minority-carriers into the body without requiring strong electric fields to accomplish the injection. We have in fact found that such injection may take place with no externally-applied potential difference, and therefore that the advantageous electrical characteristics of the device may be caused to persist down to extremely low values of the emitter supply potentials. Secondly, we have found that when appropriate collecting means are disposed in confronting relationship to the area-contact emitter, minority-carriers may be injected into the semiconductor from the entire area of the injecting contact and may be collected without requiring large collecting fields, so that very low collector supply potentials may also be utilized while retaining excellent gain and linearity. The third factor which we make use of in certain preferred embodiments of our invention will be referred to hereinafter as "proximity enhancement," in accordance with which very close spacing of the collecting means from the emitter contact has been found to provide marked enhancement of the effective injection efficiency of the emitter so as to compensate for, or overcome, any deficiencies in the intrinsic injection characteristics thereof.

Considering first the area-contact emitter employed in accordance with the invention, it will be understood that the term "area-contact" is used herein in the usual sense to distinguish from both a junction and a field-emission contact such as the point-contact or the line- or edge-contact. Thus the junction is not a contact at all, but merely a transition in the conductivity type of a semiconductive material produced by differences in the relative concentrations of fixed donor and acceptor elements occurring entirely within the continuous crystalline semiconductive body. On the other hand, the field-emission type of contact, such as the point- or edge-contact, is normally produced by forcing the contact material against the semiconductive surface so that actual penetration or at least substantial disruption of the semiconductive material occurs, and there is no well-defined area of contact. In addition the point-contact is normally "formed" so that the composition of the semiconductive material near it is modified and changed to the opposite conductivity type. In contrast, the area-contact employs an overlying material which engages the external surface of a semiconductive body without penetration, preferably with a high degree of intimacy and so that the conductive material conforms even to microscopic irregularities in the semiconductive surface without entering or modifying the composition of the semiconductive body. The surface of the body engaged by the overlying material is so prepared as to avoid stressing, fracturing or greatly modifying the crystalline structure of the semiconductor from the form it possesses within the body.

We have found that such an area-contact may be not only an excellent rectifier, having high resistance in the reverse direction, but more important for most transistor applications, it is capable of providing satisfactory and even superior minority-carrier injection from substantially the entire area thereof without large externally-applied fields. The general characteristics of an area-contact having suitable injection characteristics, and exemplary methods for producing such a contact, will be described hereinafter in detail.

Considering now the closely-confronting relationship of the collecting means to the emitter area-contact in accordance with the invention, we have found that the confronting geometry produces excellent collection of minority-carriers injected from substantially the entire area of the emitter, without requiring large collector voltages, when the spacing is close relative to the dimensions of the emitter contact, and furthermore that when the spacing is made sufficiently small in absolute dimension, the intrinsic injection efficiency of the emitter is actually enhanced by the proximity of the collecting means to the emitter. Therefore the two factors of collection efficiency and proximity enhancement together determine the effect of spacing on the current gain, alpha, of the device; the collection efficiency is determined primarily by the spacing of the collector from the emitter as compared to the lateral dimensions of the emitter, while the degree of proximity enhancement is determined by the absolute spacing. Since alpha will in any case depend upon the collection efficiency, a geometry suitable for good collection is necessary for high alpha. Whether or not proximity enhancement, and hence close absolute spacing between emitter and collecting means, is necessary in addition, depends upon whether the intrinsic gamma of the emitter contact is sufficiently high for the intended purpose. The exact spacing preferred in any particular embodiment will therefore depend upon a variety of factors such as the re-combinaton rate of the surfaces of the semiconductor, the shape, size and nature of the emitter and the collecting means, the value of current gain which is required, and in some instances the required value of the high-frequency alpha-cutoff of the final device as well as other factors not mentioned. However, in our preferred embodiments the collecting means will be spaced from the emitter contact by less than the diffusion length $L_M$ for minority-carriers in the bulk of the semiconductor, and usually by substantially less than the largest lateral dimension of the emitter. For example, in a simple embodiment described hereinafter in detail in which the emitter and collecting means are substantially flat and circular, the spacing will generally be less than the diameter of the emitter, and less than the diffusion length $L_M$. When the intrinsic injection efficiency of the emitter is substantially less than the desired value of alpha, the spacing is preferably also less than about 0.0008 inch, and typically about 0.0002 inch to realize the improvements in alpha obtainable by proximity enhancement. Because of the large number of factors determining the extent of collection by the collecting means, and because of variations in the injection efficiency of the emitter, in most instances a satisfactory spacing is best determined by experiment, recognizing that as the spacing is made closer the value of $\alpha$ may be expected to rise.

While possessing all of the previously-mentioned advantages of the junction transistor over the point-contact transistor, the device of our invention also possesses a number of additional important advantages of its own. One of the formost of these advantages lies in the simple, precise, and readily-controllable fabrication methods to which it lends itself, whereby mass production of high-quality devices is made possible. Considering as an example the form of the invention which comprises a pair of rectifying area-contacts to opposite sides of a thin portion of a semiconductive body, the fabrication of this preferred embodiment requires no troublesome alloying or crystal-growing techniques to produce the desired geometries of emitter and collector. The geometries of the emiter and collector are instead determined by the configuration of the surface of the semiconductive material, and this in turn may be acurately controlled by the electrolytic etching methods described hereinafter and in our copending application Serial No. 395,756, filed December 2, 1953, and entitled "Semiconductive Devices and Methods for the Fabrication Thereof."

For example, a transistor in accordance with our invention may be constructed by applying a pair of electrolytic jets to opposing surface regions of a semiconductive body, passing an electric current between the body and the jets in a direction to produce etching until only a thin, substantially plane-parallel region of semiconductor remains under the jet, and then reversing the current to plate metallic deposits upon opposing portions of the plane-parallel region. Not only do such processes permit extremely simple and accurate control of the emitter and collector geometries, but since they may be performed at room temperature and under the cooling influence of the liquid jets, it is possible to produce such devices without causing objectionable stresses in the resultant structure during normal operation. We have found that, by employing such methods and means, the upper end of the range of operating frequencies for stable, reproducible semiconductive amplifiers may be markedly extended. As an example only, amplifier devices in accordance with the invention having values of alpha-cutoff in excess of 60 megacycles per second and values of alpha above .96 have been reproducibly obtained.

It will be understood that the collecting means closely-confronting the emitter may take a form other than the potential-barrier region immediately adjacent to the conductor-to-semiconductor area-contact employed in the preferred embodiment of the invention, and may for example comprise the region adjacent a junction, or transition between regions of differing conductivity type, as will be described in more detail hereinafter. In any case the collecting means should be such as to provide a reduced level of minority-carrier concentration in the semiconductive material immediately adjacent thereto.

Other objects and features of the invention will be more fully understood from a consideration of the following detailing description in connection with the accompanying drawings, in which.

Figure 1:
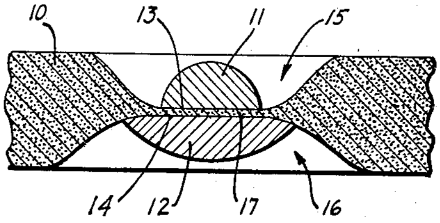
Figures 1 and 2 are a fragmentary cross-sectional view and a fragmentary perspective view, respectively, of a preferred embodiment of our invention.

Referring now in detail to Figures 1, 2, 4 and 5, wherein like numerals denote like parts, there is shown one preferred embodiment of our semiconductive device which is especially suitable for the amplification of high frequency signals. As is shown particularly in Figures 1 and 2, this preferred form of our device comprises generally a body 10 of semiconductive material and a pair of conductive electrodes 11 and 12 providing closely-confronting, rectifying area-contacts to body 10 on opposing surfaces thereof. A substantially ohmic base connection may also be applied to the wafer, as is shown at 19 in Figure 4 for example. Although the entire wafer may in some instances be uniformly thin, in the embodiment of Figures 1 and 2 we have found it advantageous to employ a wafer of substantial thickness as a means of reducing the base resistance and as a convenience in handling, and to place the electrodes 11 and 12 upon the substantially flat, bottom surfaces 13 and 14 of a pair of opposing depressions 15 and 16, respectively. A thin lamina 17 of semiconductive material then separates the substantially plane-parallel surfaces of electrodes 11 and 12.

Considering now in further detail the particular form which the various elements may take in the preferred embodiment presently under consideration, the semiconductive body 10 may be of any of a variety of substances suitable for use in the base region of a semiconductive amplifying device. Materials of this general type are now well known, and are generally characterized by the ability to provide potential current-carriers in energy states in the so-called "forbidden band" intermediate the valence band and the conduction band of the material. Although chemical compounds or physical mixtures of elements may in some instances be utilized for this purpose, more commonly the material will be a crystalline, solid element such as germanium or silicon having substantially uniformly dispersed therethrough a minute concentration of so-called significant impurities, which may be donor or acceptor elements such as arsenic or indium for example.

Among the parameters usually considered important in determining the suitability of a given semiconductive material for use in the base region of a semiconductive amplifier are the lifetime of minority-carriers in the material, and the resistivity thereof. In our device the exact value of minority-carrier lifetime in the material is not important in itself and may range anywhere from a few microseconds upwards to at least several hundred microseconds in typical applications. Similarly, the resistivity is not highly critical, excellent operation being obtained for N-type germanium with values of resistivity between 0.01 and 11 ohm-centimeters, for example. Nor is the crystal orientation critical, the 1,0,0, 1,1,0 and 1,1,1 orientations being about equally satisfactory. In general it is possible to use either N- or P-type material, although the degree of injection of minority-carriers will vary to some degree depending upon the conductivity type and the nature of the electrode formed thereon as described more fully hereinafter.

Another parameter of the semiconductive body which is significant in the design of our new amplifying device is the diffusion length $L_M$ of minority-carriers therein, a parameter which depends jointly upon the lifetime and mobility of minority-carriers therein. The diffusion length $L_M$ may be defined for the present purposes as the distance in a given semiconductive material required for the concentration of injected minority-carriers to fall to $1/e$ of the concentration at the emitter when the collector is located at a distance from the emitter which is many times greater than the diffusion length, where "$e$" is the Naperian logarithmic base. The falling-off of minority-carrier concentration is usually due principally to recombination of minority and majority carriers, and is substantially an inverse exponential function of distance from the emitter. The diffusion length $L_M$ is not in itself especially critical in our device, but should generally be larger than the spacing between the emitter and the collector.

As an example only and without intending to limit the invention in any way to particular values, a typical embodiment thereof may employ a semiconductive body comprising antimony-doped, N-type germanium having a 1,1,0 crystal orientation, a resistivity of about 2 ohm-centimeters, and a hole lifetime of about 20 microseconds or more. Typically the diffusion length for injected minority-carriers may be about 0.025 inch. Methods for producing wafers of material of such characteristics being now well known in the art, it will be unnecessary to describe in detail the requisite metallurgical and mechanical processes involved in their fabrication.

Figure 2:
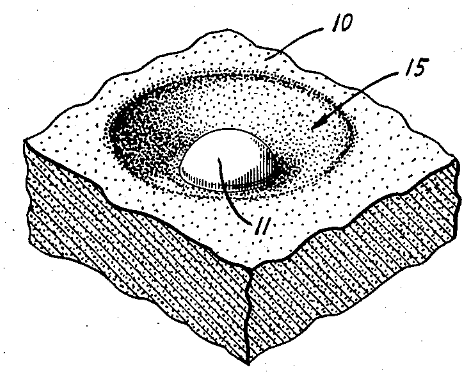

The general configuration of the body 10 is also subject to wide variation in different embodiments, although it is a convenience in manufacture in some instances to form the depressions 15 and 16 in bodies having substantially plane-parallel opposite surfaces, as will become apparent hereinafter. The peripheral outline of the wafer 10 may also be of any convenient form, such as circular or rectangular for example. The principal significant feature of the configuration shown in Figures 1 and 2 is the extremely thin lamina 17 between the bottoms of depressions 15 and 16, the surfaces of which are substantially plane-parallel and very closely spaced over a substantial area. It is the configuration of this portion of wafer 10 which permits ready provision of the pair of closely spaced, substantially plane-parallel area contacts on the bottom surfaces of the two opposing depressions, as is preferred in embodiments of our invention designed for high frequency operation.

Although it will be obvious from the foregoing that the exact configuration of the semiconductive body is subject to wide variation without materially affecting the operation of the resultant device, the following typical specifications suitable for a high-frequency transistor in accordance with the embodiments of Figures 1 and 2 are provided in the interest of complete definiteness. Wafer 10 may be a rectangular wafer 0.075 inch wide, 0.125 inch long, and 0.003 inch thick at points remote from the depressions. The depressions 15 and 16 may be approximately centered on opposite sides of the wafer, typically having circular symmetry and bottoms which are substantially plane-parallel over a substantial area thereof. Depression 15, later to be provided with the emitter electrode, may have a diameter of 0.007 inch at the surface of wafer 10, while the diameter of depression 16 may suitably be about 0.009 inch. The depths of the depressions may then be such as to provide a lamina 17 of semiconductive material having a thickness of about 0.0002 inch.

Considering now the nature of the electrodes 11 and 12, in the preferred embodiment presently under consideration these electrodes are such as to provide rectifying area-contacts to opposite surfaces 13 and 14 of body 10, as may be provided by electroplating or evaporation techniques for example, and at least one area-contact should be capable of providing some measure of minority-carrier injection into the body. In the preferred embodiment of the invention, the emitter contact has an intrinsic minority-carrier injection efficiency, gamma, which is as high as possible, where gamma is the percentage of the total emitter current which is carried by holes. However, it is also possible to utilize an emitter contact having relatively low intrinsic injection efficiency by making use of the proximity enhancement effect, as is also described fully hereinafter. The collector contact need not be of the type suitable for an emitter, but ordinarily should be a good rectifier having a relatively high reverse resistance. It is possible to obtain sufficiently good area-contacts for both the emitter and the collector, particularly for embodiments utilizing proximity enhancement, by employing conventional techniques of electroplating and evaporating metals upon a clean semiconductive surface, and by then selecting from the contacts thus formed those which appear to be most satisfactory for the present purposes. We have found that it is even possible to obtain useful minority-injection from molten or soft metallic electrodes placed gently upon the surface of the semiconductor. However, by utilizing the fabrication procedures described hereinafter in detail, we have found that satisfactory contacts are obtained in a greater percentage of cases than by other known techniques, and at the same time the desired configurations of emitter and collector are readily produced.

Although we do not wish to be limited by the details of any particular theory as to the atomic nature of area-contacts suitable for injecting minority-carriers or for providing suitable rectifying action, we believe that among the important requirements of such contacts are the following. First, there should be provided a semiconductive surface which is clean and substantially free from defects and stresses, and the area-contact should be applied in such a way as to avoid disruption of the semiconductive surface. Etching has been found to be a satisfactory way of preparing such a surface, and plating constitutes a suitably gentle mode of application of the electrode. Secondly, the electrode should have such chemical properties as will, upon contact with the semiconductor, shift the Fermi level of the semiconductor toward the valence band in the case of a hole injector, and toward the conduction band in the case of an electron injector. It is our belief that the shift of Fermi level of the semiconductor obtained in any case is in the direction of the "neutral" Fermi level of the electrode, i.e. its Fermi level when uncharged and isolated, and of a magnitude which increases with increasing differences between the neutral Fermi level of the electrode material and of the semiconductor. Finally, the value of the neutral Fermi level of a very thin portion of the electrode in direct engagement with the semiconductor may, and generally does, exert a strong influence on barrier formation in the semiconductor bulk, and any departures from the fabrication procedures described in detail hereinafter should be made only with care that the variation in procedure shall not adversely affect the nature of such surface-contacting layers.

We have found that when utilizing N-type germanium, a substantial barrier to electron flow and satisfactory hole injection can be obtained with nearly any metal which can be intimately applied. Among those which provide superior injection and rectification are platinum, indium, gold, rhodium and zinc while tin, cadmium, copper and lead have also been used. On P-type silicon, a number of metals such as zinc, indium and antimony have been found to provide excellent electron-injection as well as rectification. An electrode of platinum on an N-type silicon body may also be used as a hole injector, and weakly P-type germanium has been used with an electrode of indium to obtain hole injection. Other combinations of metals and semiconductors have also been found suitable to provide minority-carrier injecting, and rectifying, area-contacts suitable for use in our novel transistor.

As to the dimensions of the electrodes 11 and 12, the thickness of the electrodes is in no way critical although it should be sufficient to provide coverage of the semiconductive surface and to permit attachment or application of leads without undue disturbance of the semiconductive wafer. More important in a practical device are the dimensions of the area of intimate contact between the electrodes and the semiconductive wafer 10, as related to the distance between the electrodes. In general, the lateral dimensions should be sufficiently large as compared to the separation between emitter and collector, that a substantial percentage of the minority-carriers injected by the emitter and diffusing into the semiconductive body will be collected by the collector. For example, in the simple case of substantially plane, circular contact areas, the diameter of the emitter contact should ordinarily be greater than the separation between the emitter and collector contacts and is preferably at least three times greater in order to produce a satisfactorily high value of alpha. To secure best minority-carrier collection by the collector, the area of the collector contact is preferably somewhat larger than that of the emitter interface, for example about 50% greater in diameter in the case of a circular contact. Furthermore, the areas of the emitter and collector contacts are both preferably made relatively small when high frequency operation is desired. As an example only, but typical of the values appropriate in a high frequency embodiment of our device, electrodes 11 and 12 may be of indium and substantially circular in form. The diameter of emitter electrode 11 may be about 0.003 inch, that of the collector about 0.005 inch, and the thickness of each electrode may be of the order of 0.001 inch.

Figure 3:
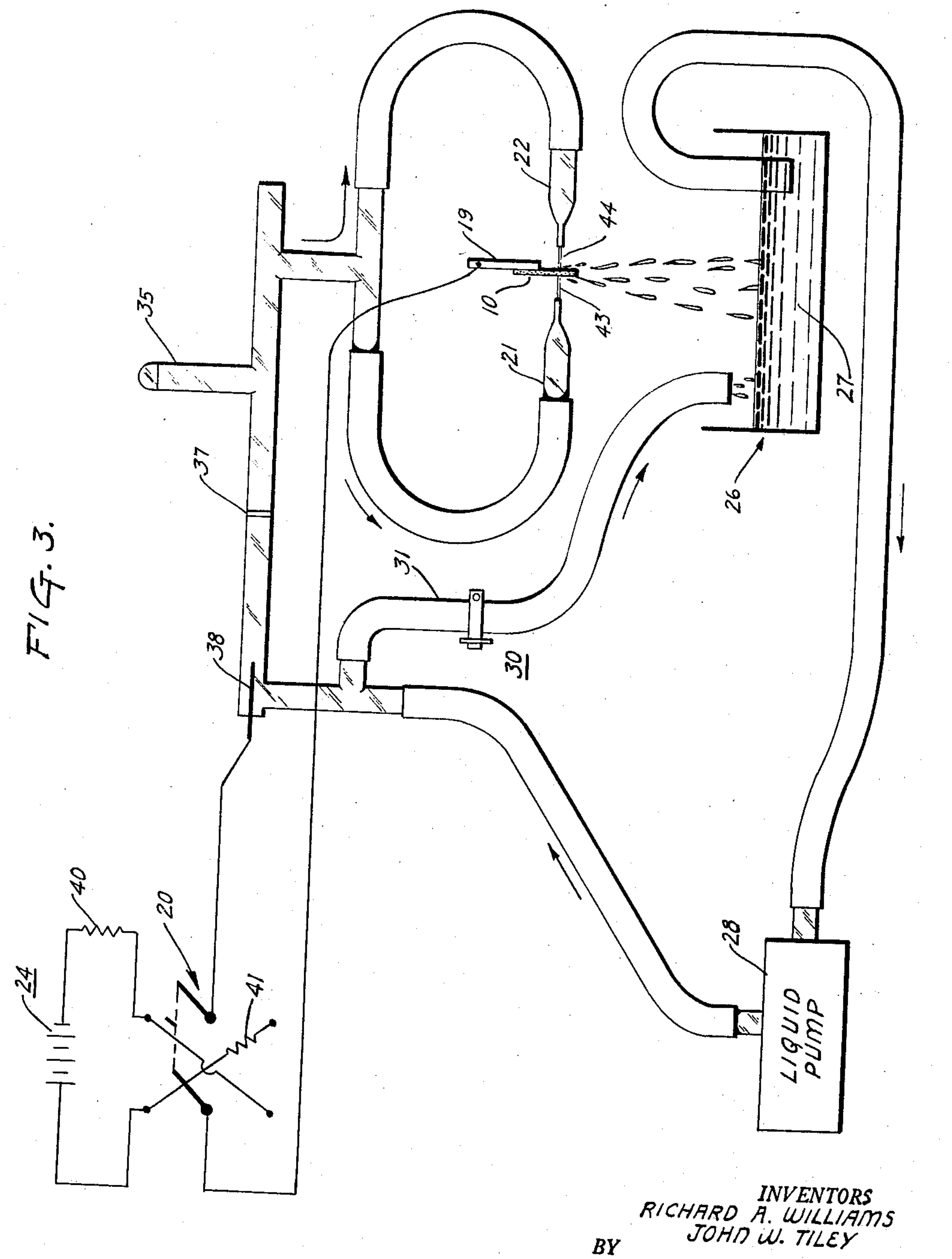
Figure 3 is a diagrammatic representation of apparatus useful in constructing our novel semiconductive amplifier in the manner which we prefer.

Considering now the preferred method of construction as it may be applied in fabricating an N-type germanium transistor and with particular reference to Figure 3, the semiconductive wafer 10 is shown in the position in which the depressions 15 and 16 are formed and the electrodes 11 and 12 applied. However, it is understood that, before placement in the position shown in Figure 3, the semiconductive material has already undergone a series of operations controlledly determinative of both its bulk and surface properties. Thus, when the wafer 10 is of germanium, it may be derived from an original N-type germanium ingot, at least a portion of which possesses the desired characteristics specified hereinbefore with regard to resistivity, minority-carrier lifetime, crystal orientation, etc. Controlled processes for producing such ingots are now well known in the art. From an appropriate portion of this ingot, a slab 0.025 inch thick may be cut and ground down to 0.005 inch thickness by means of a machine which at the same time provides substantially parallel major surfaces. This slab may then be cut up into wafers 0.075" by 0.125". Each resultant, 0.005 inch thick wafer may next be washed in ethyl alcohol and then in distilled water. Following this, the wafer may be subjected to a chemical etch until its thickness is approximately 0.003 inch, which may readily be accomplished in several minutes using an etching solution made up of one part of 45% hydrofluoric acid to four parts of 69.8% nitric acid. Next the wafer may again be washed in distilled water, and a metallic tab 19, of nickel for example, may provide ohmic contact to a portion of the wafer to facilitate handling and connection to external elements in electrical use. Connection of tab 19 may be accomplished by tinning it with a relatively low melting-point lead solder, applying a suitable flux such as Divco #335 to the region of the wafer to which connection is to be made, applying the tab to the fluxed region, and touching the tab with a hot soldering iron. The wafer is then ready for insertion in the apparatus of Figure 3. However, if immediately prior to the insertion the wafer does not appear entirely clean, it may be dipped momentarily into a solution of equal parts of 69.8% nitric acid and 48% hydrofluoric acid, care being taken not to insert the soldered tab lest it contaminate the solution.

Although the foregoing description provides a specific procedure for processing the wafer 10 prior to insertion in the apparatus of Figure 3, it will be understood that the primary objective of these preliminary steps is to provide a clean wafer of a suitable semi-conductive material, in this instance with a metal tab attached thereto, for subsequent processing, and that the particular steps thus far described are in no way essential to the attainment of this end.

Returning now to the preferred fabricating equipment diagrammatically shown in Figure 3, it is understood that the drawing is illustrative only and not to scale, wafer 10 and tab 19 for example being greatly enlarged in the interest of clarity. The broad operation of the fabricating apparatus as shown, and subsequently to be described in more detail, is to project a pair of fine jets of electrolyte upon directly opposing surfaces of semiconductive wafer 10, the electrolyte being such that, by reversal of double-pole, double-throw switch 20, the effect of the jets upon the opposing surfaces of the wafer 10 may be changed from one of etching away of the semiconductor, to a plating thereon of an appropriate electrode material. Through suitable adjustment and control, the electrolytic etching cycle may be instituted and caused to continue until the depressions 15 and 16 shown in Figures 1 and 2 are produced with only an extremely thin laminal body of semiconductor therebetween, at which time the position of switch 20 may be reversed to institute plating of the bottom of the depressions with an appropriate electrode material.

To accomplish this operation, we prefer to employ a pair of jet-forming nozzles 21 and 22, an electrolyte-circulating system for supplying liquid electrolyte to the nozzle under suitable pressure, the electrolyte itself, and a current source 24 cooperating with switch 20 and appropriate connections to provide an electric current of reversible polarity between each jet and the wafer 10.

Nozzles 21 and 22 may be of glass and provided with apertures of a diameter depending upon the desired jet sizes and hence upon the diameters of the depressions to be formed and the electrodes to be plated. Typically, one nozzle such as 21 may have an aperture diameter of about 0.004 inch for forming depression 15, while the apertures of nozzle 22 may have a diameter of above 0.005 inch for forming depression 16.

The electrolyte-circulating system may suitably comprise a glass reservoir 26 containing an adequate supply of electrolyte 27, a liquid pump 28 for drawing the electrolyte from reservior 27 and for forcing it through the circulating system and ultimately through nozzles 21 and 22, and appropriate interconnecting tubing as shown. The reservoir 26 may be located beneath the wafer 10 to catch, and to permit reuse of, the electrolyte projected upon wafer 10. Fine control of the pressure at the nozzles 21 and 22 is provided by the pressure valve 30, which controls the amount of electrolyte bled from the main circulation system by way of bleeder tube 31. Tube 31 may also conveniently empty into reservoir 26. Adjustment of the jet pressure to a predetermined value is facilitated by the inclusioin of the closed vertical pressure tube 35, the height of the electrolyte therein being a direct indication of fluid pressure. It is understood that all parts of the system in contact with the electrolyte should not only be as clean as possible, but should be substantially insoluble in, and chemically non-reactive with, the substance used as the electrolyte to avoid contamination thereof. Further to insure cleanliness of the solution, a filter such as porous glass plug 37 may also be included in the liquid flow path as shown.

The electrolyte which we prefer to use is an indium salt solution, for example indium trichloride or indium sulphate, in approximately a 0.09 normality solution for use on 2 ohm-centimeter N-type germanium. To obtain good electrical conductivity, hydrochloric acid or sulphuric acid is added to the trichloride or sulphate solutions respectively, a pH of 1.5 being suitable. The purity of the resultant solution is assured by using reagent-grade chemicals. The function of this solution is to provide a relatively strong, localized etching action upon the wafer 10 when the wafer is biased positively with respect to the electrolyte, and to provide localized plating of the wafer 10 with indium metal when the wafer is negative with respect to the electrolyte. Indium has been found to be particularly suitable in that it adheres well to the semiconductive wafer when so plated, and because of its relatively poor throwing power does not tend to deposit heavily beyond the region of the semiconductor upon which the main streams of the jets impinge. Indium is also convenient in that it can readily be etched away chemically, to permit clean-up of the wafer as well as further to control the size and configuration of the plated area subsequent to plating, as will be described hereinafter.

The electrical system includes current source 24, which should be capable of producing the required current through the electrolyte from electrode 38 to transistor tab 19, and should therefore be capable of supplying of the order of several milliamperes at about 300 volts. Operaion of switch 20 permits connection of the current source 24 to electrode 38 and tab 19 in either polarity, by way of suitable connecting wires as shown. Electrode 38, for supplying current to electrolyte 27, may suitably be a ribbon of a metal such as stainless steel which does not react with the electrolyte material. Also provided are resistors 40 and 41, so connected that when switch 20 is in position to make wafer 10 positive, and hence to provide etching, then the current is in part determined by resistor 40 but not by resistor 41; in the opposite, or plating, switch position both of resistors 40 and 41 are serially connected in the circuit. This arrangement permits instantaneous changing of the magnitude of the electrolytic current upon switching from the etching to the plating operation.

To operate the fabricating apparatus, pump 28 may be turned on with switch 20 in the neutral position so that jets 43 and 44 are formed but neither etching nor plating of wafer 10 occurs to any substantial degree. When the nozzles 21 and 22 and wafer 10 are controllably positionable by means of suitable adjustable supports (not shown), the relative positions of all three of these elements may next be adjusted until jets 43 and 44 are directed collinearly and at right angles to a portion of the surface of wafer 10 at a suitable distance from tab 19, the tab preferably extending upward from the wafer. A typical location for each nozzle is about one-quarter inch from wafer 10. With proper pump pressure, valve 30 may then be adjusted to provide a jet pressure such that the jets are well defined and smooth, and substantially laminar flow is produced upon wafer 10 by the projected electrolyte, so as to avoid formation of globules of electrolyte in the vicinity of the impinged surface.

Switch 20 may then be thrown to the position in which the positive terminal of current source 24 is connected to wafer 10, i.e. into its upward position in Figure 3. By suitable choice of resistor 40, the electric current through the solution may be caused to assume an appropriate value. The optimum current value for this purpose has been found to increase somewhat with increases in resistivity of the wafer, and typical currents range from one to three milliamperes for resistivities of 1.5 to 7 ohm-centimeters. The effect of the electrolytic jets 43 and 44 and the electric potentials is then such that the semi-conductive material is etched away in the immediate vicinity of the areas of impingment of the jets. This etching operation is preferably continued until only a thin lamina of semiconductor remains between the bottoms of the two opposing, etched depressions. As indicated hereinbefore, a lamina thickness of about 0.0002 inch is suitable. Although a variety of methods may be employed to determine the proper time at which to cease etching, a particularly simple one comprises first test-etching a pair of opposing depressions in the same wafer until their bottoms just meet, as indicated by an observable perforation in the wafer 10, noting the elapsed etching time for which perforation first occurs, and then displacing the wafer slightly and repeating the etching at an adjacent point for a period slightly less than that determined to be necessary for perforation. When this method is to be employed, the larger wafer surfaces are preferably plane-parallel, to provide substantially equal wafer thicknesses at the two displaced etching sites.

Upon the completion of the etching-out of the depressions, switch 20 is then reversed and the plating operation begins. For this operation, the electrolytic current may suitably be about 0.7 milliampere as determined by the value of resistor 41, and application of the current contined for about a minute as an example. Upon completion of plating, the wafer 10 may be removed from its support and washed in distilled water. Following this, the wafer is dipped into a chemical etching solution which attacks and dissolves indium so as to remove any indium spattered on portions of the wafer remote from the desired electrode locations, to "etch back" the plated electrodes to the desired diameter, and to improve the rectifying and injecting qualities of the contacts. A suitable etchant for this purpose is a solution of one part of 48% hydrofluoric acid and one part of 69.8 nitric acid in four parts of water. Dipping in this solution is terminated when the wafer appears to be clean and the electrodes are of the desired size. The wafer is then ready for mounting into a suitable physical assembly as described with reference to Figure 4.

The foregoing detailed description of one possible method of fabrication is understood to relate to procedures appropriate under ordinary conditions of ambient room temperature, humidity and illumination. In particular it has been found that, if in the case of N-type germanium the region of jet impingement is dark or but dimly illuminated, then the rate and nature of the etching become relatively critical functions of illuminations. However, when the illumination is greater than a predetermined minimum, its value is not critical and relatively rapid etching is obtained. We have found it appropriate, for example, to focus upon opposite sides of the wafer during etching and plating, light from a pair of 18 watt microscopic lamps, each placed about 6 inches from the wafer, to insure the desired minimum illumination.

Figure 4:
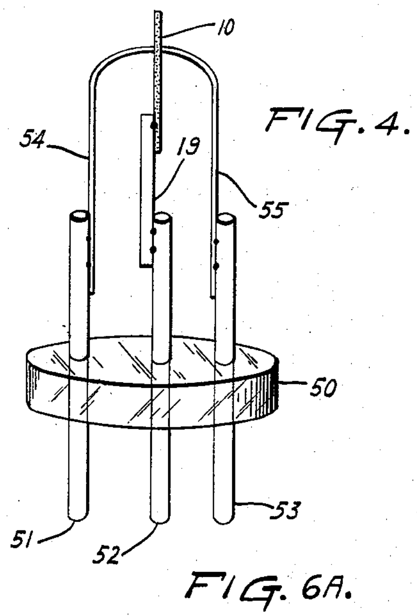
Figure 4 is a perspective view showing a mechanical assembly which may be utilized to mount our novel amplifying devices.

The embodiment of our novel transistor shown in Figures 1 and 2 may readily be assembled into any of a variety of useful and commercial forms. The form shown in Figure 4 by way of example only is of a standard 3-pin type, but our device is also readily adaptable to use in coaxial-type assemblies. In Figure 4, a glass base 50 is shown through which pass three metallic support pins 51, 52 and 53. Tap 19, providing the base connection to wafer 10, is spot-welded to pin 52, while a pair of contact wires 54 and 55 are similarly welded to pins 51 and 53 respectively. These contact wires may suitably be of 0.003 inch diameter wire composed of rhodium and platinum in the proportions 10% to 90% respectively, and are spring-tensioned against the emitter and collector electrode on wafer 10. Since the function of wires 54 and 55 is merely to provide electrical connection, they are not usually sharpened. The complete assembled unit may then be potted and/or hemetically sealed to protect it from vibration and contamination. As an example only, a globule of hot, liquid polystyrene may be applied to bind the contact wires to wafer 10, and the entire unit then sealed into a plastic case filled with silicone grease.

Figure 5:
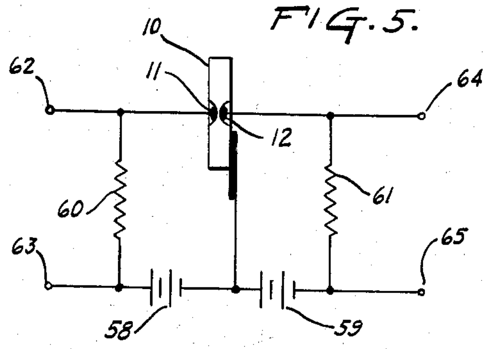
Figure 5 is a schematic diagram of a simple amplifying stage utilizing our novel device as the gain-providing element thereof.

Figure 5 illustrates a simple amplifying stage constructed in accordance with our invention, wherein the gain providing element comprises the amplifying device shown in Figures 1 and 2, and corresponding parts are indicated by corresponding numerals. In this circuit it is assumed that the semiconductive wafer 10 is N-type germanium, and since the emitter should be biased in a relatively more conductive condition than the collector in order to obtain satisfactory gain, potential source 58 supplies a positive voltage to emitter electrode 11 to bias it in the forward direction, while potential source 59 supplies a negative voltage to collector electrode 12 to bias it in the back direction. It is understood that whatever the metal and semiconductive material, the polarities of sources 58 and 59 should be such as to inject minority-carriers into the base and to permit their collection by the collector. An input load impedance represented by resistance 60 is included in series with the emitter-biasing circuit and an output load impedance represented by resistor 61 is in series in the collector biasing circuit.

Input signals supplied across resistor 60, by way of input terminals 62 and 63, then produce similar variations in emitter current, which in turn effect corresponding variations in the collector current through output resistor 61 and hence in the output voltage between output terminals 64 and 65. With a suitably high value of output load resistance, large power gains are then obtained between the emitter and collector circuits.

As examples only, the following values of circuit parameters are typical in the arrangement of Figure 5:

Resistor 60=500 ohms
Resistor 61=10,000 ohms
Voltage of source 58=.25 volt
Voltage of source 59=3 volts
Input signal amplitude=0.1 volt
Output signal amplitude=1.9 volts
Power gain=22 decibels It will be understood that the circuit of Figure 5 has been chosen for its extreme simplicity, and that in various applications many different and/or more complicated circuit arrangements will be appropriate as of course is also the case with the conventional junction transistors for example. Rather than to demonstrate the utility and operational advantages of our invention by detailed descriptions of its many circuit uses, it will be appropriate to describe instead certain values of the critical operational parameters of our device which may readily be obtained, and from which appropriate applications will become apparent to those skilled in the art. However, it is in no way to be inferred that the values now to be set forth indicate the ultimate limits obtainable with devices made in accordance with our invention or that other values and combination of values are not equally possible.

In a typical transistor of the preferred type described hereinbefore utilizing 3 and 5 mil diameter emitter and collector contacts respectively, separated by a substantially 0.2 mil lamina of N-type germanium, the collector capacitance may be 2 $\mu\mu$f., the base resistance 1,000 ohms and the alpha-cutoff frequency 60 mc. per second. The collector current with zero emitter voltage is typically 2.5 microamperes, alpha 0.96, the emitter resistance 50 ohms, and the collector resistance 500,000 ohms. The noise figure for such a unit may be about 6 db at 10 mc. It is understood that the parameters described have the meanings usual in the art, the standard operating conditions for measuring purposes being 0.5 milliampere of collector current at a collector voltage of 3 volts.

With the parameters as specified above by way of example, a voltage gain of 19 may be obtained for the simple circuit arrangement of Figure 5. Units having characteristics superior to those designated above have also been constructed, and none of the parameters specified are in any way inherently limited to the values given. However, the indicated value of alpha cutoff of 60 mc., which has already been obtained consistently, represents an outstanding improvement over values of alpha cutoff known to have been obtainable by comparable prior art devices, and makes posisble consistent and stable amplification by semiconductive devices at unprecedentedly high frequencies.

The procedure for fabricating a silicon transistor utilizing conduction-band electrons as the minority-carriers may be generally similar to that for the germanium transistor described above, with certain modifications which will become apparent from the following detailed description of one typical process, which is set forth in detail in the interest of complete definiteness.

A blank of P-type silicon having a resistivity between 1 and 20 ohm-cm. and a lifetime greater than 10 microseconds is cut into wafers 20 mils thick, the orientation of the crystalline structure being of little importance. These wafers are then lapped to 10 mil thickness and diced into rectangular blanks 80 mils by 160 mils. The blanks may then be chemically etched in so-called CP-4, an etchant having a constitution of 15 cc. 48.5% HF, 25 cc. 69.8% $HNO_3$, 15 cc. 99.8% acetic acid and 10 drops bromine. This chemical etching is continued until the blanks have a thickness of approximately 3 mils, after which they are rinsed in distilled water.

The base tab is affixed in the following manner. A nickel tab 5 mils by 65 mils by ¼ inch is tinned on one side of one end, using pure tin solder and Divco No. 335 flux. A blank is placed against the tab in a carbon jig, and the assembly heated to 900° C. for one minute in the presence of helium. The assembly is then cooled at 200° C. per minute until room temperature is again reached, at which time the blank with the nickel tab soldered thereto is removed from the jig, washed in distilled water, dried, and coated with a suitable resist such as polystyrene cement over the tinned area, to isolate this area from the solutions used in the etching and plating operations which follow.

In the etching step, there are employed a pair of glass nozzles forming a pair of corresponding jets of electrolyte directed against opposite surfaces of the silicon blank, these nozzles having inside diameters of about 10 and 12 mils respectively, the distance between the end of each nozzle and the surface of the silicon blank suitably being about one-fourth inch. An electrolyte suitable for this step is a 0.4 normal solution of sodium fluoride in water, ejected from the nozzles at a pressure of approximately 8 pounds per square inch. During this process a suitable power supply maintains the semi-conductive blank positive with respect to the jet, and the regions of impingement of the two jets upon the silicon blank are illuminated strongly, as by directing a standard 30 watt microscope lamp upon each surface from a distance of about 3 inches. Under these conditions the sodium fluoride solution electrochemically etches the silicon blank in the regions directly under the two jets. The bias applied between the jet and the silicon blank is controlled to allow approximately 5 milliamperes of current to flow.

Etching is continued until the desired thickness of the semiconductive body is obtained. A convenient indication of the thickness is the color of light transmitted through the body, as described in detail in the copending application Serial No. 424,704 of Thomas Sikina, filed April 21, 1954, and entitled "Method and Apparatus for Producing Semiconductive Structures." To provide a body thickness of about 0.3 mil, etching is discontinued when light transmitted through the thinning portion of the blank changes from a deep red to an orange color at which time the bias supply circuit is opened and etching is terminated. The diameters of the craters thus formed by the 10 and 12 mil jets are approximately 25 and 30 mils respectively. The time ordinarily required for this etching operation, beginning with a silicon blank approximately 3 mils in thickness, is of the order of 3 or 4 minutes.

The blanks are then prepared for electroplating by immersing them in a chemical etchant consisting of four parts 48.5% HF and six parts 69.8% $HNO_3$, for a period of about one second. After this etch, the blank is quickly rinsed in distilled water, dried, and placed between a pair of opposing nozzles from which jets of plating solution are ejected against the bottoms of the depressions formed in the silicon blank in the previous etching process. A suitable solution for the plating operation is a 0.1 normal solution of zinc chloride in ethylene glycol. Such a nonaqueous solution has been found to provide silicon transistors of longer life than are obtained with aqueous plating solutions. The strong illumination employed in the jet-etching step is preferably continued during plating.

The inside diameters of the plating nozzles may typically be 6 and 8 mils respectively, in which case sufficient negative bias is applied to the nickel tab so that the total current flowing through the solution is of the order of 0.5 milliampere. Under these conditions, metallic deposits of zinc of about 12 and 15 mils diameter respectively will be plated upon the bottoms of the 25 and 30 mil diameter pits. With a plating time of about 1 minute, the dots will ordinarily be about 0.4 mil in thickness, which is suitable for present purposes.

After the above plating operation, the unit is removed from between the jets, rinsed in distilled water and immersed for 1 second in an etch consisting of one part 69.8% $HNO_3$, one part 48.5% HF and ten parts distilled water. Following this the unit is again rinsed in distilled water and dried.

The silicon blank may then be rinsed again in distilled water, and immersed for 1 second in a clean-up etch consisting of 3 parts 99.8% acetic acid, 1 part 69.8% $HNO_3$, and 1 part 48.5% HF. This results in cleaning of the surface of the silicon, reducing somewhat the size of the metal dot, and providing the proper surrounding surface adjacent the periphery of the dots so as to obtain the desired rectifying and injecting contacts.

Either prior or after the clean-up etch, the unit may be assembled into any suitable holder, and appropriate contacts applied, either by the spring contacting arrangement described hereinbefore, or in some cases by a quick soldering operation utilizing a small amount of heat briefly applied to the region between the contacting element and the deposited electrode.

A silicon transistor made by the foregoing process will typically have electrical characteristics as follows:

Collector capacity, $C_c=4$ micromicrofarads
Collector resistance, $R_c=750{,}000$ ohms
Alpha cutoff, $F_{ac}=20$ mc./s.
Base resistance, $R_b=1500$ ohms
Collector current with zero emitter voltage,
$I_{c0}=0.005$ microampere
Alpha=0.93
Emitter resistance=50 ohms Although not wishing to be limited by any theory as to the mode of operation of our novel device, we believe the following considerations to be helpful in utilizing and applying our invention. First, it appears that the effect of the closely-confronting configuration of emitter and collecting means which we employ is to encourage the flow of minority-carriers to the collector from the central portions of the emitter as well as from the peripheral regions, thereby to take advantage of the minority-carrier injecting properties of the entire area of the contact. To accomplish this in the usual case in which the flow of minority-carriers in the base is principally by diffusion, the collecting means should be sufficiently close to the central portions of the emitter compared to the transverse dimensions of the emitter that the collecting means can collect efficiently, and without requiring high fields, a substantial fraction of the minority-carriers injected into the body from the interior of the emitter, as well as those from peripheral portions of the emitter. Since the majority-carrier current it not increased by this arrangement, the alpha of the transistor is greatly improved by this geometry.

The advantages obtained by this close spacing of emitter and collector relative to the transverse dimensions of the emitter may be realized in embodiments of the invention departing substantially from the exact geometry shown in Figures 1 and 2. For example, where as in Figure 1 the emitter and collecting means are substantially plane-parallel circles, the opposing alignment of the emitter and collecting means as well as the ratio between their diameters may be varied substantially while retaining acceptable operation. Similarly the degree of parallelness and flatness of the emitter and collector may also be varied to a substantial extent from the preferred arrangement shown, and any of a variety of configurations may be used for the emitter or collecting means. However, in general, the greater the percentage of the area of the emitter which is closely spaced from the collecting means with respect to the least dimension of the area in question, the better will be the alpha of the transistor, and the closer and more nearly parallel are the emitter and the collecting means, the higher is the alpha cut-off.

As examples of some of the considerations significant in selecting the form of closely-confronting geometry appropriate in various circumstances, reference is made to the diagrams of Figures 6A to 6D, from which a showing of the intervening semiconductor has been omitted in the interest of clarity. If the emitter and collector have the rectangular shape shown in Figure 6A, the spacing is preferably small compared with the width W, which is the least transverse dimension. If as in Fig. 6B the area-contacts are ring-shaped, the spacing may suitably be small compared to the width of the ring rather than the diameter thereof, which again is the least transverse dimension.

Figure 6A:
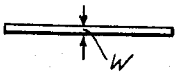
Figures 6A to 6D are diagrammatic views of a variety of electrode geometries which may be utilized in various forms of the invention.
Figure 6B:
Figure 6C:
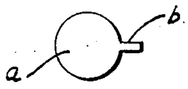

Figure 6C illustrates a possible configuration of area-contacts which comprise one region *a* which is substantially circular, and a rectangular promontory *b* of lesser area than region *a*. For a contact having the form of region *a*, the spacing of the collecting means would appropriately be small relative to the diameter of region *a*; for a contact having the form of *b*, the spacing would normally be small compared to the width of the rectangle. While by appropriate shaping of the thickness of the semiconductive body the collecting means could be provided with two different spacings for the two different regions, the thickness of the semiconductor will ordinarily be nearly constant beneath the emitter contact, so that the spacing will be substantially the same for both regions. In this case the smaller value of spacing may be employed, i.e. the spacing may be made small compared to the width of rectangle *b*. However, this spacing is less than is necessary, since for most of the emitter area the least dimension is the diameter of region *a*. An intermediate value of spacing would therefore be satisfactory for this configuration; in the present case the intermediate spacing may be the average of the individual maximum values for regions *a* and *b*, each weighted in proportion to the area of the corresponding region.

Figure 6D:
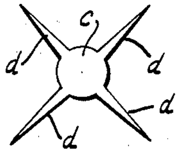

However, this method of obtaining a suitable intermediate value of spacing for irregularly-shaped emitters is not satisfactory in all cases, as may be exemplified in connection with Figure 6D. In this instance the emitter contact is made up of a central, substantially circular portion *c* and a plurality of pointed, needlelike prominences *d*. In this case, the prominences taper to sharp points and the least dimension for each is substantially zero; therefore it is not pratical to make the spacing small compared to the least dimension of the prominences *d*, although this condition can perhaps be met for many of the wider portions of the prominences. However, a spacing small compared with the diameter of region *c* will not assure proper operation, and even though the area of region *c* may exceed the combined areas of prominences *d*, a spacing one-half as great as that suitable for region *c* may be not at all satisfactory for the composite emitter shown. Minority-carrier emission from the points of prominences *d* will generally be great and largely lost to the adjacent surfaces; to utilize such a configuration will ordinarily require an extremely close spacing of the collecting means for best operation.

It will therefore be appreciated that for simple shapes such as the circle, the closely-confronting relationship of collecting means and emitter is susceptible of expression by stating that the spacing shall be small compared to the least transverse dimension of the emitter, but that for more complicated configurations it can only be said that the spacing should be small compared to the maximum lateral dimension of the emitter, and in any event sufficiently small to cause a substantial number of the emitted minority-carriers to reach the collector. Since mechanical difficulties and maximum operating voltage considerations make it desirable to use a spacing no smaller than considerations of alpha and alpha-cutoff require, the better configurations of emitter are those for which the ratio of periphery to area is small and the least transverse dimension substantially the same for most parts of the emitter. Thus the preferred configuration is the flat, circular emitter, which has a small ratio of periphery-to-area and a low maximum radius of curvature.

While the spacing of emitter from collector, relative to the transverse dimensions of the emitter, will determine the percentage of injected minority-carriers collected, the injection efficiency of the emitter has been found to depend upon the absolute value of the spacing between the two. As the spacing between emitter and collector is reduced below about 0.0008 inch, the difference between the gamma of the emitter and unity is reduced toward zero due to an effect which we have designated proximity enhancement. When the intrinsic gamma of the emitter contact without such enhancement is adequate to produce the desired value of alpha, such close spacings are not necessary. Thus, we have found it possible to fabricate transistors of the type described herein which provide circuit gain while using a base region of N-type germanium between emitter and collector of two mils thickness, for which the degree of proximity enhancement is negligible. However, when the intrinsic gamma of the emitter contact is so much lower than unity that the desired value of alpha cannot be obtained, proximity enhancement by means of spacings below about 0.0008 inch is important. Even in instances where contacts having satisfactory intrinsic gamma have been made, proximity enhancement may be of importance in minimizing any degeneration of intrinsic gamma or of surface recombination rate during life. Furthermore it permits of greater flexibility in the fabrication procedures utilized in forming the emitter, and in any case improves the effective gamma of the device to some degree.

Therefore, in our preferred embodiment, we utilize a spacing between emitter and collector or less than 0.0008 inch and preferably about 0.0002 inch. The effect of such close absolute spacings is apparently to increase the diffusion gradient for minority-carriers at the emitter, thereby increasing the flow of minority-carriers without correspondingly increasing the majority-carrier current. In this way the effective gamma of the contact and the alpha of the transistor may be caused to approach closely to unity.

As an example only, we have found that an indium area-contact so made as to have a gamma of only about 0.5 when the collector is spaced farther away than the diffusion length, may have a gamma as high as 0.95 for a spacing of about 0.0002 inch, when the diffusion length is about 0.025 inch.

Figure 7:
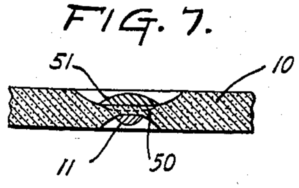
Figure 7 is a sectional view of another embodiment of our invention.

From the foregoing it will be apparent that our invention is not limited to the particular manner of fabrication described in detail hereinbefore, since both the desired configuration of the electrodes and the desired types of metal-to-semiconductor interface may be at least approximated by techniques quite different in their details from those described above. Nor is it necessary that the collector be of the area-contact type, since one may instead use a P–N junction for this purpose. For example, a semiconductive amplifier utilizing a P–N junction as collector and a metal-to-semiconductor area-contact as emitter may be constructed by depositing the collector electrode first, using a metal suitable for converting the base material to the opposite conductivity type, alloying the collector electrode material somewhat into the semiconductor to form a junction, and then depositing the emitter electrode on the opposite surface. Such a structure is shown in Figure 7, wherein the semiconductive base 10 is provided with an area-contact emitter 11 and a P–N junction 50 formed by alloying an acceptor metal 51, such as indium, into the base. It is also possible to include a region of intrinsic semiconductor between the P- and N-type regions of such a P–N junction collector, or between the collector contact and the base region of the preferred form of our invention described hereinbefore. In this instance the collecting means is the entire structure for producing the collecting field confronting the emitter, viz., the intrinsic region and the associated P- or N-type region, or the area-contact, from which the collected current is normally withdrawn.

In connection with the embodiments of the invention described herein, it will be understood that the effective spacing of the collecting means from the emitter is determined in part by the width of the collector barrier, that is, the thickness of the depletion region produced adjacent the collecting interface or junction, for it is in this depletion region that minority-carriers are quickly accelerated to the collector by electric fields in the semiconductor. The thickness of this region is in turn dependent upon the nature of the collector and the magnitude of the collecting potential applied thereto. The effective position of the surface of the collecting means from which the spacing between emitter and collector measured may therefore be varied to some extent by varying the applied collector potential. For small applied potentials the depletion region is very thin, of the order of 0.02 mil, and the spacing of the collecting means is therefore substantially the same as that of the collector element. When larger collector potentials are used the collector element itself may be spaced from the emitter quite differently than the collecting means, and it is the spacing of the collecting means which determines collection efficiency and proximity enhancement. However, in our preferred embodiment, the spacing between the emitter and collector elements themselves is small, and the thickness of the collector depletion layer in turn much smaller, since the effective spacing between emitter and collecting means is then determined substantially entirely by the invariable configuration of the accurately-delineated surface, with consequent advantages in high-frequency performance, Although we have described our invention with particular reference to specific embodiments thereof in order to provide a degree of definition such as to enable one skilled in the art readily to practice it, it is to be understood that the invention is in no way limited to such arrangements and methods, but is susceptible of embodiment in any of a wide variety of equivalent forms without departing from the spirit thereof.

We claim:

1. A semiconductor signal-translating device comprising a body of semiconductive material, an overlying, primarily metallic material in area-contact with a surface region of said body for injecting minority-carriers into said body, and asymmetrically-conductive minority-carrier collecting means in closely-confronting relationship to said area-contact.

2. The device of claim 1, in which said collecting means comprises a structure for providing a collecting field along a geometric surface closely-confronting said area-contact.

3. The device of claim 1 in which said collecting means comprises an area-contact between a primarily metallic material and a surface region of said body.

4. The device of claim 1, in which said collecting means comprises a region of transition in the conductivity of said body.

5. A semiconductor amplifying device comprising a body of semiconductive material, an emitter of minority-carriers, and an asymmetrically-conductive collector of minority-carriers confronting said emitter and closely spaced therefrom, at least said emitter comprising an area-contact between a primarily metallic material and said body.

6. The device of claim 5, in which said contact has an area large compared to the square of the distance between said emitter and said collector.

7. The device of claim 5, in which said area-contact is between said body and a metallic electrode electroplated thereon.

8. A semiconductor amplifying device comprising an emitter, an asymmetrically-conductive collector and a body of semiconductive material, at least said emitter comprising a rectifying area-contact between a primarily metallic material and said semiconductive material, said collector confronting said emitter and being located sufficiently close to said emitter to increase substantially the emission of minority carriers thereby.

9. A semiconductor device comprising an emitter, a collector and a base element, said base element having a region of substantially reduced thickness, at least said emitter comprising an area-contact between a primarily metallic substance and a surface of said region.

10. As a semiconductor structure, a thin laminal body of semiconductive material and a pair of primarily metallic electrodes in rectifying area-contact with opposing surfaces of said body.

11. The structure of claim 10, in which said electrodes are spaced by less than 4% of the diffusion length of minority carriers in said semiconductive material.

12. The structure of claim 11, in which said lamina has a thickness of less than substantially 0.0008 inch between said electrodes.

13. As an injector of minority carriers into a semiconductive body, an area-contact between an electrolytically-etched surface of said body and a primarily metallic electrode plated thereon.

14. The structure of claim 13, in which said contact is between an electrolyte-jet etched surface of said body and said plated electrode.

15. As an injector of minority carriers into a semiconductive body, an area-contact between an electrolytically-etched surface of said body and an electro-deposited metallic electrode.

16. The structure of claim 15 in which said semiconductor is selected from the group comprising germanium and silicon.

17. An asymmetrically-conductive device, comprising a metallic area-contact jet-electrolytically plated upon a jet-electrolytically etched surface of a semiconductive body.

18. A device in accordance with claim 1, in which said area-contact is asymmetrically conductive and responsive to a forward-biasing voltage to inject minority-carriers into said body, said device comprising in addition a substantially ohmic connection to said body, means for applying between said primarily metallic material and said substantially ohmic connection a voltage to forward-bias said area-contact, and means for applying to said collecting means a potential differing from that of said primarily metallic material in the polarity to attract said minority carriers.

19. A semiconductor device comprising a body of semiconductive material having closely-spaced, opposed surface regions, and a pair of rectifying metal-to-semiconductor area-contacts arranged in closely-confronting configuration on said opposed surface regions, said body being of a single conductivity-type between said surface regions.

20. The device of claim 19, in which said body is of N-type germanium.

21. The device of claim 19, in which said body is of single-crystalline N-type germanium and in which the thickness of said body between said opposed surface regions is of the order of a quarter of a mil.

22. A semiconductive device comprising a body of semiconductive material, a broad-area P–N junction within said body, and a rectifying area-contact to a surface of said body closely confronting said broad area of said junction.

References Cited in the file of this patent

UNITED STATES PATENTS

| | | |
|---|---|---|
| 2,502,479 | Pearson et al. | Apr. 4, 1950 |
| 2,563,503 | Wallace | Aug. 7, 1951 |
| 2,577,803 | Pfann | Dec. 11, 1951 |
| 2,644,852 | Dunlap | July 7, 1953 |
| 2,672,528 | Shockley | Mar. 16, 1954 |
| 2,680,220 | Starr et al. | June 1, 1954 |
| 2,725,505 | Webster et al. | Nov. 29, 1955 |
| 2,735,050 | Armstrong | Feb. 14, 1956 |
| 2,742,383 | Barnes et al. | Apr. 17, 1956 |
| 2,764,642 | Shockley | Sept. 25, 1956 |
| 2,765,516 | Haegele | Oct. 9, 1956 |
| 2,792,538 | Pfann | May 14, 1957 |
| 2,813,233 | Shockley | Nov. 12, 1957 |

FOREIGN PATENTS

| | | |
|---|---|---|
| 1,038,658 | France | May 13, 1953 |
| 1,080,034 | France | May 26, 1954 |

UNITED STATES PATENT OFFICE

CERTIFICATE OF CORRECTION

May 5, 1959

Patent No. 2,885,571

Richard A. Williams et al.

It is hereby certified that error appears in the printed specification of the above numbered patent requiring correction and that the said Letters Patent should read as corrected below.

Column 5, line 50, for "acurately" read -- accurately --; column 7, line 29, for "The" read -- This --; column 11, line 2, for "inclusioin" read -- inclusion --; line 40, for the syllable "aion" read -- ation --; column 14, line 19, for "posisble" read -- possible --; column 16, line 15, for "current it" read -- current is --; column 17, line 74, for "collector or" read -- collector of --; column 18, line 57, after "collector" insert -- is --.

Signed and sealed this 31st day of January 1961.

(SEAL)
Attest:

KARL H. AXLINE
Attesting Officer

ROBERT C. WATSON
Commissioner of Patents